United States Patent
Shen et al.

(10) Patent No.: US 7,821,488 B2
(45) Date of Patent: Oct. 26, 2010

(54) TEMPERATURE-DEPENDENT OVERDRIVE CIRCUIT FOR LCD PANEL AND METHOD OF IMPLEMENTING THE SAME

(75) Inventors: Yun-Hung Shen, Hsin-Chu (TW); Steve Wiyi Yang, Hsin-Chu Hsien (TW)

(73) Assignee: MStar Semiconductor, Inc., ChuPei, Hsin-Chu Hsien (TW)

(*) Notice: Subject to any disclaimer, the term of this patent is extended or adjusted under 35 U.S.C. 154(b) by 893 days.

(21) Appl. No.: 11/686,960

(22) Filed: Mar. 16, 2007

(65) Prior Publication Data
US 2008/0224981 A1    Sep. 18, 2008

(51) Int. Cl.
G09G 3/36 (2006.01)
G06F 3/038 (2006.01)
G02F 1/133 (2006.01)

(52) U.S. Cl. .................... 345/101; 345/87; 345/98; 345/204; 349/72

(58) Field of Classification Search ............ 345/89, 345/98, 101, 87, 204, 601; 349/72
See application file for complete search history.

(56) References Cited

U.S. PATENT DOCUMENTS

| | | | |
|---|---|---|---|
| 6,397,021 B2* | 5/2002 | Hayashi et al. | 399/69 |
| 7,106,287 B2* | 9/2006 | Ham | 345/89 |
| 7,642,999 B2* | 1/2010 | Oura | 345/98 |
| 2006/0024563 A1 | 2/2006 | Ogura | |
| 2006/0103682 A1 | 5/2006 | Kunimori et al. | |
| 2006/0158415 A1* | 7/2006 | Izumi | 345/98 |
| 2007/0052643 A1* | 3/2007 | Li et al. | 345/89 |

* cited by examiner

Primary Examiner—Bipin Shalwala
Assistant Examiner—Sosina Abebe
(74) Attorney, Agent, or Firm—Winston Hsu; Scott Margo; Min-Lee Teng

(57) ABSTRACT

A circuit for overdriving an LCD panel according to an image data and a temperature, and the corresponding are disclosed. The circuit includes: a memory for storing a previous image data; a plurality of LUTs, each coupled to receive the previous image data from the memory and a present image data, for storing overdrive values; a first temperature sensor, for sensing the temperature of a first area of the LCD panel to generate a first temperature data; a control circuit, for generating a selection signal and a temperature correction coefficient according to the first temperature data; a selection circuit, coupled to the plurality of LUTs, for selecting one LUT from the plurality of LUTs according to the selection signal and outputting the overdrive value of the selected LUT; and an overdrive processor, for generating adjusted image data according to the overdrive value and the temperature correction coefficient.

32 Claims, 6 Drawing Sheets

| Temperature (°C) | ~0 | 1~10 | 11~20 | 21~30 | 31~40 | 41~50 |
|---|---|---|---|---|---|---|
| Control value | 000 | 001 | 010 | 011 | 100 | 101 |

Fig. 2

TEMPERATURE-DEPENDENT OVERDRIVE CIRCUIT FOR LCD PANEL AND METHOD OF IMPLEMENTING THE SAME

BACKGROUND OF INVENTION

1. Field of the Invention

The present invention relates generally to an overdrive circuit and a method of overdriving an LCD panel, especially to a temperature dependent overdrive circuit and the method thereof.

2. Description of the Prior Art

An overdrive circuit is frequently utilized in an LCD panel because the response time of the liquid crystal molecule is slow. Conventionally LCD panels utilize a look up table (LUT) to store overdrive values. The overdrive circuit generates adjusted image data by looking up the LUT according to the present and the previous image data. However, the response time of the liquid crystal molecule depends on the temperature. Therefore, the overdrive value should be adjusted accordingly when the LCD panel operates under different temperatures.

SUMMARY OF INVENTION

It is therefore a primary objective of the claimed invention to provide a circuit for overdriving an LCD panel according to an image data and a temperature, and the method thereof.

According to an embodiment of the claimed invention, a circuit for overdriving an LCD panel according to an image data and a temperature is disclosed. The circuit includes: a memory for storing a previous image data; a plurality of look up tables (LUTs), each coupled to receive the previous image data from the memory and a present image data, for storing overdrive values; a first temperature sensor, for sensing the temperature of a first area of the LCD panel to generate a first temperature data; a control circuit, coupled to the first temperature sensor, for generating a selection signal and a temperature correction coefficient according to the first temperature data; a selection circuit, coupled to the plurality of LUTs, for selecting one LUT from the plurality of LUTs according to the selection signal and outputting the overdrive value of the selected LUT; and an overdrive processor, coupled to the selection circuit and the control circuit, for generating adjusted image data according to the overdrive value and the temperature correction coefficient.

According to another embodiment of the claimed invention, a circuit for overdriving an LCD panel according to an image data and a temperature is disclosed. The circuit includes: a memory for storing a previous image data; a plurality of look up tables (LUTs), each coupled to receive the previous image data from the memory and a present image data, for storing overdrive values; a first temperature sensor, for sensing the temperature of a first area of the LCD panel to generate a first temperature data; a second temperature sensor, for sensing the temperature of a second area of the LCD panel to generate a second temperature data; a control circuit, coupled to the first temperature sensor and the second temperature sensor, for generating a selection signal and a temperature correction coefficient according to the first temperature data or the second temperature data; a selection circuit, coupled to the plurality of LUTs, for selecting one LUT from the plurality of LUTs according to the selection signal and outputting the overdrive value of the selected LUT; and an overdrive processor, coupled to the selection circuit and the control circuit, for generating adjusted image data according to the overdrive value and the temperature correction coefficient.

According to still another embodiment of the claimed invention, a method for overdriving an LCD panel according to an image data and a temperature is disclosed. The method includes: generating a plurality of overdrive values according to a previous image data and a present image data; sensing the temperature of a first area of the LCD panel to generate a first temperature data; generating a selection signal and a temperature correction coefficient according to the temperature data; selecting one overdrive value from the plurality of overdrive values according to the selection signal; and generating adjusted image data according to the overdrive value and the temperature correction coefficient.

According to still another embodiment of the claimed invention, a method for overdriving an LCD panel according to an image data and a temperature is disclosed. The method includes: generating a plurality of overdrive values according to a previous image data and a present image data; sensing the temperature of a first area of the LCD panel to generate a first temperature data; sensing the temperature of a second area of the LCD panel to generate a second temperature data; generating a selection signal and a temperature correction coefficient according to the first temperature data or the second temperature data; selecting one overdrive value from the plurality of overdrive values according to the selection signal; and generating adjusted image data according to the overdrive value and the temperature correction coefficient.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 2 shows a temperature table which the control circuit utilized to classify the temperature data.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
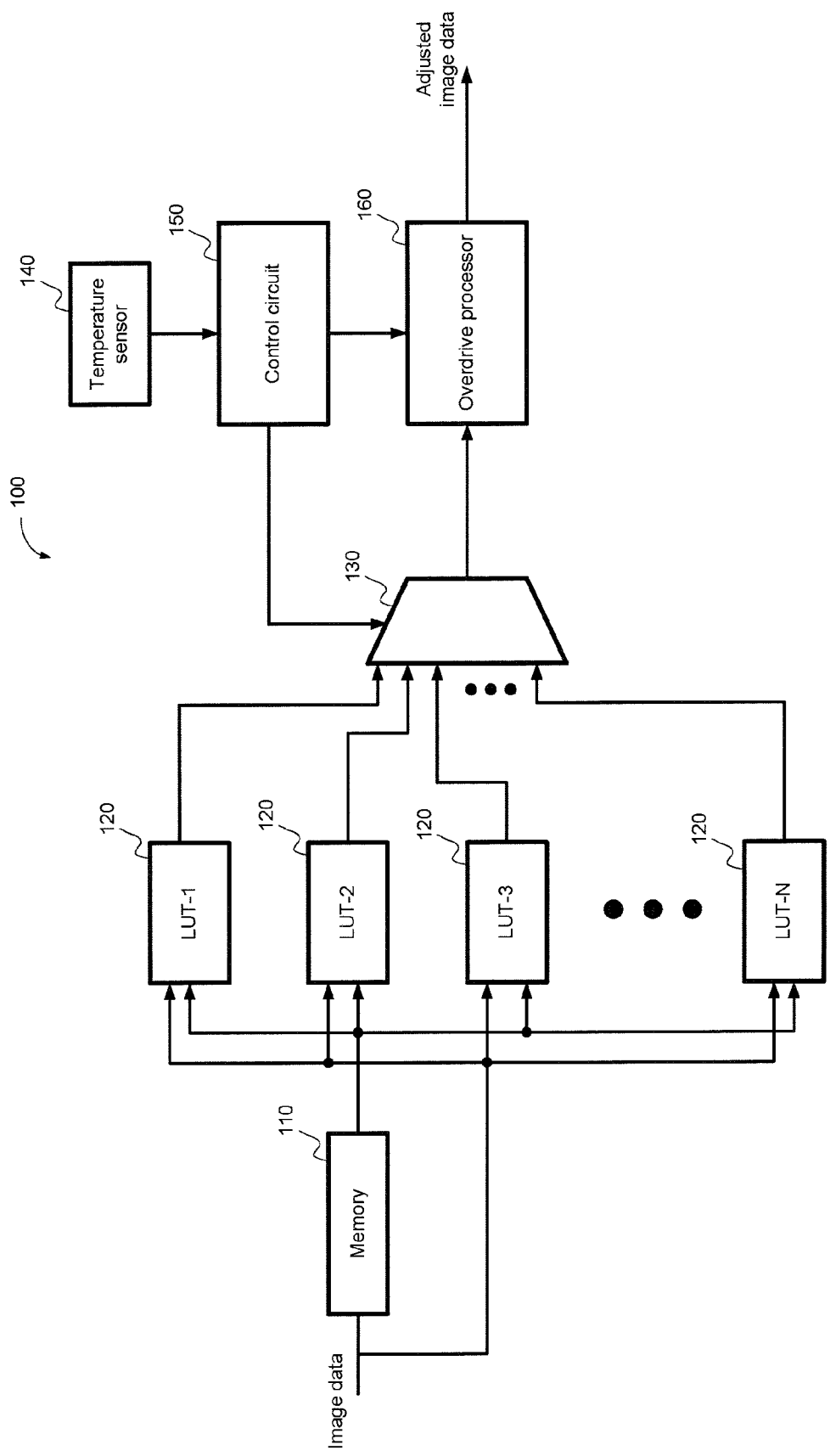
FIG. 1 shows an overdrive circuit according to a first embodiment of the present invention.

Please refer to FIG. 1. FIG. 1 shows an overdrive circuit according to a first embodiment of the present invention. The overdrive circuit 100 includes a memory 110, a plurality of LUTs 120, a selection circuit 130, a temperature sensor 140, a control circuit 150, and an overdrive processor 160. The memory 110 receives a present image data and stores the image data. N look up tables 120 denoted by LUT-1, LUT-2, ..., and LUT-N, are coupled to the memory 110, and each of them stores overdrive values. These LUTs 120 receive not only the previous image data from the memory 110, but the present image data. Each LUT 120 stores different overdrive values and outputs an overdrive value according to the present and the previous image data.

The temperature sensor 140 senses the temperature of the LCD panel or the ambient temperature of the environment where the LCD panel is working; therefore the temperature sensor 140 can be set up inside the LCD panel or outside the LCD panel but quite near it. The temperature sensor 140 generates a temperature data according to a sensed temperature.

The control circuit 150 is coupled to the temperature sensor 140. The control circuit 150 receives the temperature data and classifies the temperature data according to a plurality of predetermined temperature segments; for example, it is assumed that the LCD panel works from below 0° C. to a maximum temperature of 50° C., and every ten degree is set to be a segment. Please refer to FIG. 2. FIG. 2 shows a temperature table which the control circuit utilized to classify the temperature data. Therefore, if the temperature data is 31° C., it will be classified in the 31~40 segment. Each segment has a corresponding control value to which the control circuit 150 refers to generate a selection signal. For example, if the temperature data is 31° C., the control circuit 150 utilizes the control value "100" of the 31~40 segment as the selection signal.

The selection signal is received by the selection circuit 130 which is coupled to the plurality of LUTs 120 and the control circuit 150. According to the selection signal, the selection circuit 130 selects one overdrive value outputted from one of the LUTs 120. For example, if the selection signal from the control circuit 150 represents a value of "100" in binary, the selection circuit 130 selects overdrive value of the third LUT, LUT-3, and then outputs the selected overdrive value. Generally, the number of LUTs 120 corresponds to the number of temperature segments. For example, as shown in FIG. 2, since there are 6 temperature segments, the number of LUTs 120 is also 6. To be more specific, each LUT is designed for a temperature segment; therefore, as the LCD panel works in different temperature, different LUT will be selected to perform the overdrive process. As a result, by introducing a plurality of temperature-dependant LUTs, the overdrive process is more accurate and flexible.

Figure 3:
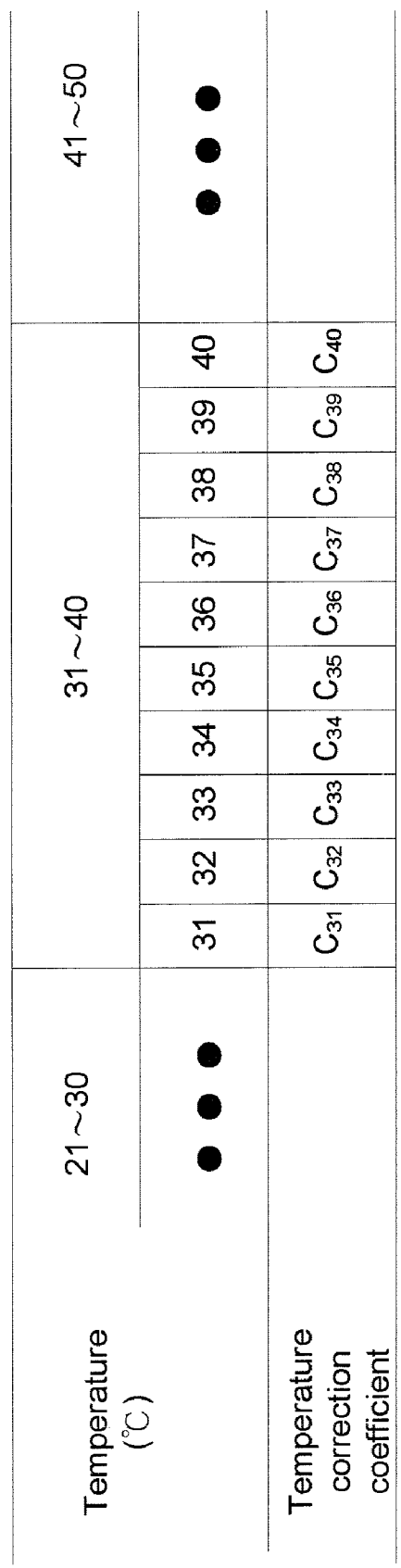
FIG. 3 is a temperature table illustrating the correspondence between temperature and the temperature correction coefficient.

In additions to the selection signal, the control circuit 150 also generates a temperature correction coefficient which is a value corresponding to a more precise temperature utilized to fine tune the overdrive value. Please refer to FIG. 3. FIG. 3 is a temperature table illustrating the correspondence between temperature and the temperature correction coefficient. Taking the temperature segment 31~40 for example, there are ten temperature correction coefficients ($C_{31}$~$C_{40}$) corresponding respectively to every integer temperature. If the temperature data is 31, the corresponding temperature correction coefficient $C_{31}$ will be selected. However, it is not necessary to provide every integer temperature in a temperature segment with a temperature correction coefficient. For example, every two temperatures in a row, such as [31° C., 32° C.] or [39° C., 40° C.], can be assigned to the same temperature correction coefficient, like $C_{31, 32}$, and $C_{39, 40}$. In another embodiment, temperature correction coefficients may be provided to only some temperatures within one temperature segment, for example, providing $C_{31}$, $C_{33}$, $C_{35}$, $C_{37}$, $C_{39}$ respectively to temperature 31° C., 33° C., 35° C., 37° C., and 39° C. The rest of the temperature correction coefficients within the same temperature segment can be generated by interpolation.

Finally, the overdrive processor 160, which is coupled to the selection circuit 130 and the control circuit 150, receives the overdrive value and the temperature correction coefficient. The overdrive processor 160 generates an adjusted image data according to the overdrive value and the temperature correction coefficient. For example, the overdrive processor 160 may multiplies the overdrive value by the temperature correction coefficient to generate the adjusted image data; or the overdrive processor 160 may add the temperature correction coefficient to the overdrive value to generate the adjusted image data. The LCD panel then shows images according to the adjusted image data, and therefore the LCD panel is overdriven according to the temperature.

Figure 4:
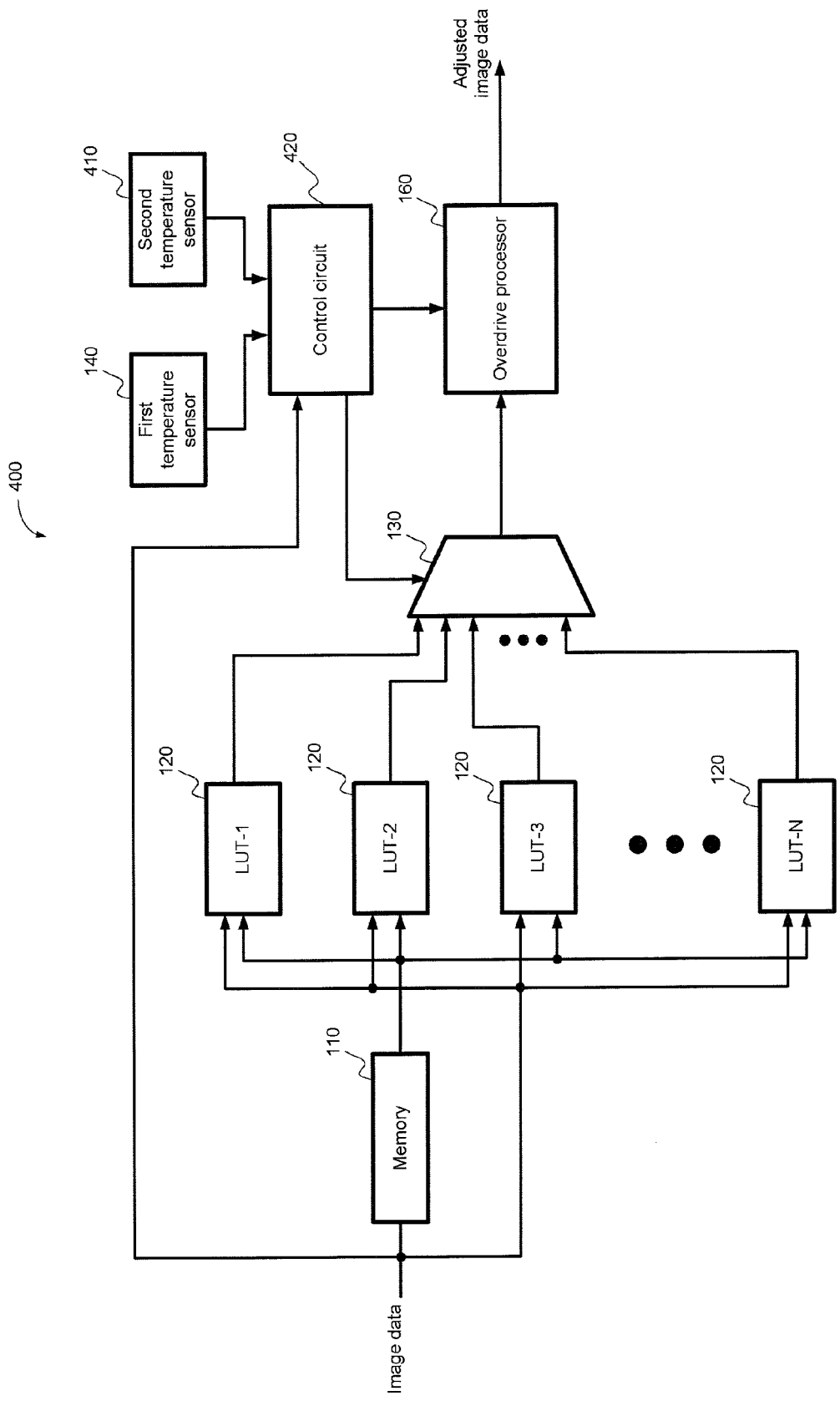
FIG. 4 shows an overdrive circuit according to a second embodiment of the present invention.

Please refer to FIG. 4. FIG. 4 shows an overdrive circuit according to a second embodiment of the present invention. The overdrive circuit 400 includes the memory 110, the plurality of LUTs 120, the selection circuit 130, at least two temperature sensors 140 and 410, a control circuit 420, and an overdrive processor 160. The elements of the overdrive circuit 400 have the same function as those elements designated by the same numeral of the overdrive circuit 100. The difference between the overdrive circuits 100 and 400 is that the overdrive circuit 400 has an additional temperature sensor 410 and the control circuit further receives the present image data.

The temperature sensor 140 senses the temperature of a first area of the LCD panel to generate a first temperature data, and the temperature sensor 410 senses the temperature of a second area of the LCD panel to generate a second temperature data. These two temperature sensors 140 and 410 are both coupled to the control circuit 420. Again, these two temperature sensors 140 and 410 may be set up inside the LCD panel or outside the LCD panel but quite near it.

The control circuit 420 generates a reference temperature data according to the first temperature data and the second temperature data. For example, the control circuit 420 may average the first temperature data and the second temperature data to generate the reference temperature data. Then the control circuit 420 generates the selection signal and the temperature correction coefficient according to the reference temperature by referring to the temperature tables shown in FIGS. 2 and 3. The control circuit 420 also receives the present image data and determines in whether the first area or the second area of the LCD panel the present image data is about to show. If the present image data is determined to show in the first area of the LCD panel, the control circuit 420 generates the selection signal and the temperature correction coefficient by classifying the first temperature data according to the temperature tables shown in FIGS. 2 and 3; similarly, if the present image data is determined to show in the second area of the LCD panel, the control circuit 420 generates the selection signal and the temperature correction coefficient by classifying the second temperature data according to the temperature tables shown in FIGS. 2 and 3. Therefore, if the LCD panel works in an environment in which the temperature is not uniform, the overdrive values can be selected and adjusted with respect to different areas of the LCD panel.

Figure 5:
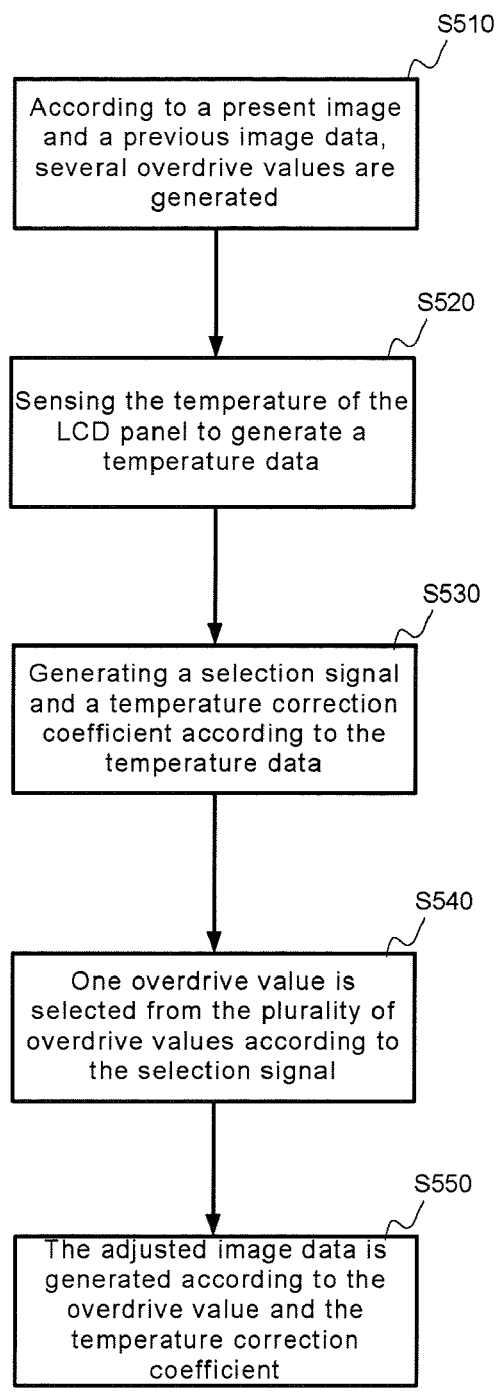
FIG. 5 shows a flow chart of the temperature dependent overdriving method according to a first embodiment of the present invention.

Please refer to FIG. 5. FIG. 5 shows a flow chart of the temperature dependent overdriving method according to a first embodiment of the present invention. First, according to a present image and a previous image data, several overdrive values are generated (S510). Then, sensing the temperature of the LCD panel to generate a temperature data (S520). Generating a selection signal and a temperature correction coefficient according to the temperature data (S530). More specifically, the temperature data is classified according to a plurality of temperature segments. Each segment has a control value, and the control value of the temperature segment, which the temperature data corresponds to, is utilized as the selection signal. Similarly, the temperature correction coefficient is generated by classifying the temperature data according to other temperature segments with finer temperature intervals. Then, one overdrive value is selected from the plurality of overdrive values according to the selection signal (S540). Finally, the adjusted image data is generated according to the overdrive value and the temperature correction coefficient (S550).

Figure 6:
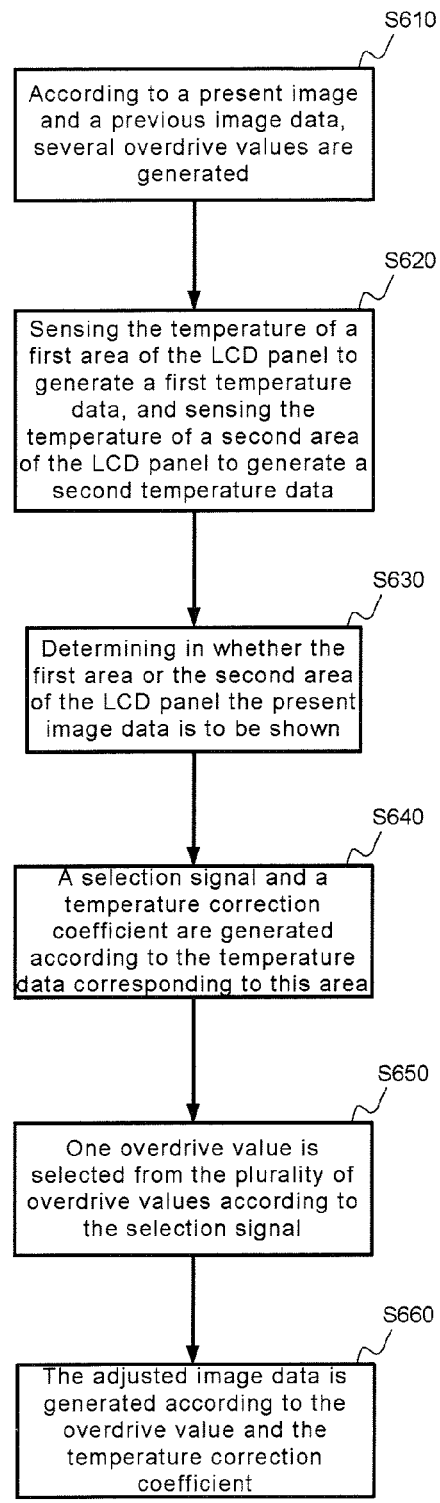
FIG. 6 shows a flow chart of the temperature dependent overdriving method according to a second embodiment of the present invention.

Please refer to FIG. 6. FIG. 6 shows a flow chart of the temperature dependent overdriving method according to a second embodiment of the present invention. First, according to a present image and a previous image data, several overdrive values are generated (610). Then, sensing the temperature of a first area of the LCD panel to generate a first temperature data, and sensing the temperature of a second area of the LCD panel to generate a second temperature data (620). Determining in whether the first area or the second area of the LCD panel the present image data is to be shown (630). Once the area is determined, a selection signal and a temperature correction coefficient are generated according to the temperature data corresponding to this area (640). More specifically, when the present image data is determined to be shown in the first area, the selection signal and the temperature correction coefficient are generated according to the first temperature data; however, when the present image data is determined to be shown in the second area, the selection signal and the temperature correction coefficient are generated according to the second temperature data. Then, one overdrive value is selected from the plurality of overdrive values according to the selection signal (650). Finally, the adjusted image data is generated according to the overdrive value and the temperature correction coefficient (660).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A circuit for overdriving an LCD panel according to an image data and a temperature, comprising:
   a memory for storing a previous image data;
   a plurality of look up tables (LUTs), each coupled to receive the previous image data from the memory and a present image data, for storing overdrive values;
   a first temperature sensor, for sensing the temperature of a first area of the LCD panel to generate a first temperature data;
   a control circuit, coupled to the first temperature sensor, for generating a selection signal and a temperature correction coefficient according to the first temperature data;
   a selection circuit, coupled to the plurality of LUTs, for selecting one LUT from the plurality of LUTs according to the selection signal and outputting the overdrive value of the selected LUT; and
   an overdrive processor, coupled to the selection circuit and the control circuit, for generating adjusted image data according to the overdrive value and the temperature correction coefficient.

2. The circuit of claim 1, wherein the temperature sensor is inside the LCD panel.

3. The circuit of claim 1, wherein the temperature sensor is outside and near the LCD panel.

4. The circuit of claim 1, wherein the control circuit classifies the first temperature data according to a plurality of temperature segments, each temperature segment having a control value, and the control circuit outputs the control value of the corresponding temperature segment as the selection signal.

5. The circuit of claim 1, wherein the control circuit classifies the temperature data according to a plurality of temperature segments, each temperature segment having the temperature correction coefficient, and the control circuit outputs the temperature correction coefficient.

6. The circuit of claim 1, wherein the overdrive processor multiplies the overdrive value by the temperature correction coefficient to generate the adjusted image data.

7. The circuit of claim 1, wherein the overdrive processor adds the temperature correction coefficient to the overdrive value to generate the adjusted image data.

8. The circuit of claim 1 further comprising a second temperature sensor for sensing a second area of the LCD panel to generate a second temperature data; wherein
   the control circuit is further coupled to the second temperature sensor, and calculates the first temperature data and the second temperature data to generate a reference temperature data; and generates the selection signal and the temperature correction coefficient according to the reference temperature data.

9. The circuit of claim 8, wherein the reference temperature data is the average of the first temperature data and the second temperature data.

10. A circuit for overdriving an LCD panel according to an image data and a temperature, comprising:
    a memory for storing a previous image data;
    a plurality of look up tables (LUTs), each coupled to receive the previous image data from the memory and a present image data, for storing overdrive values;
    a first temperature sensor, for sensing the temperature of a first area of the LCD panel to generate a first temperature data;
    a second temperature sensor, for sensing the temperature of a second area of the LCD panel to generate a second temperature data;
    a control circuit, coupled to the first temperature sensor and the second temperature sensor, for generating a selection signal and a temperature correction coefficient according to the first temperature data or the second temperature data;
    a selection circuit, coupled to the plurality of LUTs, for selecting one LUT from the plurality of LUTs according to the selection signal and outputting the overdrive value of the selected LUT; and
    an overdrive processor, coupled to the selection circuit and the control circuit, for generating adjusted image data according to the overdrive value and the temperature correction coefficient.

11. The circuit of claim 10, wherein the first and the second sensor are inside the LCD panel.

12. The circuit of claim 10, wherein the first and the second sensor are outside and near the LCD panel.

13. The circuit of claim 10, wherein the control circuit further receives the present image data, and determines in whether the first area or the second area of the LCD panel the present image data is to be shown.

14. The circuit of claim 13, wherein when the control circuit determines that the present image data is to be shown in the first area, the control circuit generates the selection signal and the temperature correction coefficient according to the first temperature data, and when the control circuit determines that the present image data is to be shown in the second area, the control circuit generates the selection signal and the temperature correction coefficient according to the second temperature data.

15. The circuit of claim 10, wherein the control circuit classifies the first temperature data or the second temperature data according to a plurality of temperature segments, each temperature segment having a control value, and the control circuit outputs the control value of the corresponding temperature segment as the selection signal.

16. The circuit of claim 10, wherein the control circuit classifies the first temperature data or the second temperature data according to a plurality of temperature segments, each temperature segment having the temperature correction coefficient, and the control circuit outputs the temperature correction coefficient.

17. The circuit of claim 10, wherein the overdrive processor multiplies the overdrive value by the temperature correction coefficient to generate the adjusted image data.

18. The circuit of claim 10, wherein the overdrive processor adds the temperature correction coefficient to the overdrive value to generate the adjusted image data.

19. A method for overdriving an LCD panel according to an image data and a temperature, comprising:
   generating a plurality of overdrive values according to a previous image data and a present image data;
   sensing the temperature of a first area of the LCD panel to generate a first temperature data;
   generating a selection signal and a temperature correction coefficient according to the temperature data;
   selecting one overdrive value from the plurality of overdrive values according to the selection signal; and
   generating adjusted image data according to the overdrive value and the temperature correction coefficient.

20. The method of claim 19, further comprising:
   classifying the first temperature data according to a plurality of temperature segments, each temperature segment having a control value, and outputting the control value of the corresponding temperature segment as the selection signal.

21. The method of claim 19, further comprising:
   classifying the first temperature data according to a plurality of temperature segments, each temperature segment having the temperature correction coefficient, and outputting the temperature correction coefficient.

22. The method of claim 19, wherein the overdrive value is multiplied by the temperature correction coefficient to generate the adjusted image data.

23. The method of claim 19, wherein the overdrive value is added by the temperature correction coefficient to generate the adjusted image data.

24. The method of claim 19, further comprising:
   sensing the temperature of a second area of the LCD panel to generate a second temperature data; and
   calculating the first temperature data and the second temperature data to generate a reference temperature data; wherein
   the selection signal and the temperature correction coefficient are generated according to the reference temperature data.

25. The method of claim 24, wherein the reference temperature data is the average of the first temperature data and the second temperature data.

26. A method for overdriving an LCD panel according to an image data and a temperature, comprising:
   generating a plurality of overdrive values according to a previous image data and a present image data;
   sensing the temperature of a first area of the LCD panel to generate a first temperature data;
   sensing the temperature of a second area of the LCD panel to generate a second temperature data;
   generating a selection signal and a temperature correction coefficient according to the first temperature data or the second temperature data;
   selecting one overdrive value from the plurality of overdrive values according to the selection signal; and
   generating adjusted image data according to the overdrive value and the temperature correction coefficient.

27. The method of claim 26, further comprising:
   determining in whether the first area or the second area of the LCD panel the present image data is to be shown.

28. The method of claim 27, wherein the selection signal and the temperature correction coefficient are generated according to the first temperature data when the present image data is determined to be shown in the first area; and the selection signal and the temperature correction coefficient are generated according to the second temperature data when the present image data is determined to be shown in the second area.

29. The method of claim 26, further comprising:
   classifying the first temperature data or the second temperature data according to a plurality of temperature segments, each temperature segment having a control value, and outputting the control value of the corresponding temperature segment as the selection signal.

30. The method of claim 26, further comprising:
   classifying the reference temperature data according to a plurality of temperature segments, each temperature segment having the temperature correction coefficient, and outputting the temperature correction coefficient.

31. The method of claim 26, wherein the overdrive value is multiplied by the temperature correction coefficient to generate the adjusted image data.

32. The method of claim 26, wherein the overdrive value is added by the temperature correction coefficient to generate the adjusted image data.

* * * * *